US011301145B2

(12) United States Patent
Jeong (10) Patent No.: US 11,301,145 B2
(45) Date of Patent: Apr. 12, 2022

(54) STORAGE DEVICE PROVIDING DISCONNECTION FROM HOST WITHOUT LOSS OF DATA

(71) Applicant: SAMSUNG ELECTRONICS CO., LTD., Suwon-si (KR)

(72) Inventor: Jong Wook Jeong, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 204 days.

(21) Appl. No.: 16/506,579

(22) Filed: Jul. 9, 2019

(65) Prior Publication Data

US 2020/0142611 A1 May 7, 2020

(51) Int. Cl.
*G06F 3/06* (2006.01)
*G06F 11/14* (2006.01)
*G06F 13/42* (2006.01)

(52) U.S. Cl.
CPC .......... *G06F 3/0619* (2013.01); *G06F 3/0656* (2013.01); *G06F 3/0679* (2013.01); *G06F 11/1469* (2013.01); *G06F 11/1471* (2013.01); *G06F 13/4282* (2013.01); *G06F 2213/0026* (2013.01)

(58) Field of Classification Search
CPC combination set(s) only.
See application file for complete search history.

(56) References Cited

U.S. PATENT DOCUMENTS

| 7,908,504 | B2 | 3/2011 | Feldman et al. |
| 9,042,197 | B2 | 5/2015 | Allison et al. |
| 2003/0161199 | A1* | 8/2003 | Estakhri ............... G11C 16/349 365/200 |
| 2006/0007576 | A1* | 1/2006 | Georgis ................ G06F 3/0607 360/69 |
| 2006/0080515 | A1* | 4/2006 | Spiers ................. G06F 11/1441 711/162 |
| 2011/0093650 | A1* | 4/2011 | Kwon ................. G06F 12/0246 711/103 |
| 2017/0228154 | A1 | 8/2017 | Liu et al. |
| 2018/0011524 | A1 | 1/2018 | Stumpf et al. |
| 2018/0032390 | A1 | 2/2018 | Rahmanian et al. |

FOREIGN PATENT DOCUMENTS

| JP | 09152918 A | 6/1997 |
| JP | 11297083 A | 10/1999 |
| JP | 2015146089 A | 8/2015 |

* cited by examiner

*Primary Examiner* — Tammara R Peyton
(74) *Attorney, Agent, or Firm* — Volentine, Whitt & Francos, PLLC (57) ABSTRACT

A storage device configured for connection with a host includes; an output unit configured to provide at least one storage device operating state indication to a user, an input unit configured to accept at least one user input, a main memory configured to temporarily store data received from the host, a storage configured to store the data in non-volatile memory space, and a controller configured to execute a backup operation in response to a user input accepted by the input unit, transfer data from the main memory to the storage during the backup operation, and provide a storage device operating state indication through the output unit during execution of the backup operation.

20 Claims, 10 Drawing Sheets

STORAGE DEVICE PROVIDING DISCONNECTION FROM HOST WITHOUT LOSS OF DATA

CROSS-REFERENCE TO RELATED APPLICATION(S)

This application claims benefit of priority to Korean Patent Application No. 10-2018-0132681 filed on Nov. 1, 2018 in the Korean Intellectual Property Office, the disclosure of which is incorporated herein by reference in its entirety.

BACKGROUND

1. Field

The inventive concept relates to storage devices configured for connection to and operation with a host device, such as a server. The inventive concept also relates to methods of operating storage devices configured for connection to and operation with a host device, such as a server.

2. Description of Related Art

A server providing various services may include one or more server modules respectively connecting one or more storage devices. As needed, storage device(s) may be connected or disconnected from a server module.

However, disconnection of a storage device from a server module—under the wrong conditions or while the storage device is operating in certain states—creates a possibility of losing data. Recognizing that storage device(s) must be periodically disconnected from the server mode for maintenance, the inherent possibility of losing data during the disconnection process must be address.

SUMMARY

One aspect of the inventive concept provides a storage device configured for connection with a host. The storage device includes; an output unit configured to provide at least one storage device operating state indication to a user, an input unit configured to accept at least one user input, a main memory configured to temporarily store data received from the host, a storage configured to store the data in non-volatile memory space, and a controller configured to execute a backup operation in response to a user input accepted by the input unit, transfer data from the main memory to the storage during the backup operation, and provide a storage device operating state indication through the output unit during execution of the backup operation.

Another aspect of the inventive concept provides a method of operating a storage device configured for connection with a host. The method includes; receiving data from the host and temporarily storing the data in a main memory, receiving a user input through an input unit, executing a backup operation in response to the user input, wherein the data temporarily stored in the main memory is transferred to non-volatile memory provided by a storage during the backup operation, and providing a storage device operating state indication to the user through an output unit during execution of the backup operation.

Another aspect of the inventive concept provides a method of operating a storage device configured for connection to a continuously operating host. The method includes; determining whether an input command is received through an input unit when the storage device is connected to the host and executing a normal operation that communicates data from the host and temporarily stores the data in a main memory of the storage device, upon determining that the input command is received, performing a backup operation during which the data temporarily stored in the main memory of the storage device is transferred to non-volatile memory space provided by a storage, and during a least a portion of the execution of the backup operation, providing a backup operation progress indication through an output unit.

Another aspect of the inventive concept provides a method of operating a storage device configured for connection to a continuously operating host. The method includes; determining whether an input command is received through an input unit when the storage device is connected to the host and executing a normal operation that communicates data from the host and temporarily stores the data in a main memory of the storage device, upon determining that the input command is received, further determining whether the storage device is communicating with the host, if the storage device is communicating with the host, executing a backup operation while providing a backup operation progress indication through an output unit, else if the storage device is not communicating with the host, determining whether the a background operation is being executed, and if the background operation is being executed, complete execution of the backup operation while providing a background operation progress indication through the output unit, else if the background operation is not being executed executing a recovery operation while providing a recovery operation progress indication through the output unit.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the inventive concept will be described with reference to the accompanying drawings.

Figure 1:
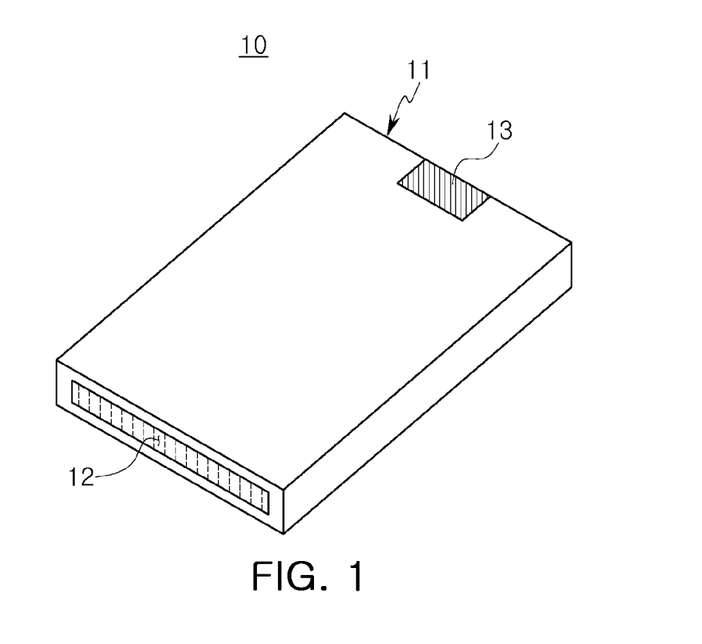
FIGS. 1 and 2 are corresponding left/right perspective views of a storage device according to an embodiment of the inventive concept.
Figure 2:
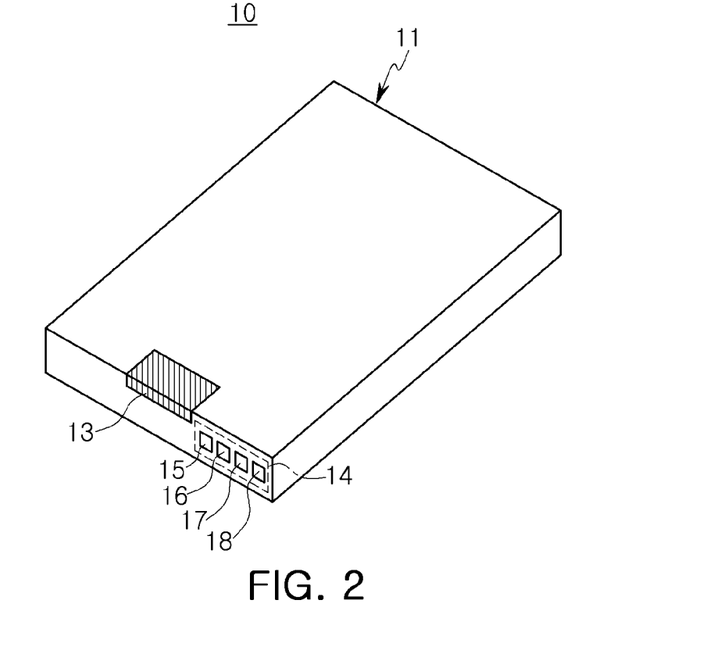

FIGS. 1 and 2 are corresponding left/right, perspective views of a storage device 10 according to an embodiment of the inventive concept.

Referring to FIGS. 1 and 2, the storage device 10 is an external storage device that may be connected to an external interface of a host (not shown). In certain embodiments the storage device 10 may be a solid state drive (SSD) device including a nonvolatile memory. The various components of the storage device 10 may be physically mounted on and electrically through a housing 11.

The storage device 10 illustrated in FIGS. 1 and 2 includes an interface 12 providing mechanical and/or electrical (hereafter, "mechanical/electrical") connection to the host, as well as an input unit 13, and an output unit 14. Here, the input unit 13 and output unit 14 are physically separated one from another, where the output unit 14 is configured to provide one or more storage device operating state indication(s) and the input unit 13 is configured to accept (or receive) one or more user inputs. In this regard, the input unit 13 may include one or more mechanically activate-able element(s), hereafter simply referred to as "button(s)" that may be manipulated by a user to create the one or more user inputs. The output unit 14 may include one or more light emitting diodes (LEDS), e.g., LEDs 15, 16, 17 and 18. However, the number and arrangement of LEDS included in a storage device according to embodiments of the inventive concept is a matter of design choice.

As will be described in some addition detail hereafter, where the output unit 14 includes one or more LEDs, the LEDs may be variously illuminated in recognizable patterns respectively associated with storage device operating states. Thus, the LEDs may be used to provide different, visually-discernable storage device operating state indications.

The interface 12 may include one or more port(s) adapted to mechanical/electrical connection to the host. In this regard, the host may have many different forms, but in certain embodiments the host to which the storage device 10 is connected via the interface 12 may be a server module. In certain embodiments of the inventive concept, the interface 12 may be disposed on a rearward-facing side surface of the storage device 10 opposing a forward-facing side surface of the storage device in which the input unit 13 and the output unit 14 may be commonly disposed. In this context, the term "forward-facing" denotes a side surface of the storage device 100 proximate to a user, whereas the term "rearward-facing" denotes a side surface proximate the host.

A predetermined input command may be generated in response to activation of a button included in the input unit 13 once the host and the storage device 10 are connected. In response to the input command, a controller of the storage device 10 may temporarily store data communicated from the host via the interface 12. In this regard, the data may initially be stored in a main memory providing relatively high-speed, volatile data storage (i.e., including one or more volatile memory devices such as Dynamic Random Access Memory (DRAM), Synchronous RAM (SRAM), etc.).

Upon being temporarily stored, wholly or in part, in the main memory, the data may be communicated (or transferred) from the main memory to a storage providing nonvolatile data storage in response to the input command During the temporary storage of data in main memory and/or transfer of data to the storage, the controller may activate one or more LEDs of the output unit 14 to visually indicate progress of the data storage operation. For example, the controller may variously activate LEDs 15 to 18 according to different patterns according to the state of a data storage operation (e.g., a first LED pattern may indicate that data is being stored in the storage, a second LED pattern may indicate that the storage device 10 is waiting for data from the host, a third LED pattern may indicate that the data storage operation is complete, etc.).

Thus, the controller may turn ON a first LED 15 during a data storage operation, and turn OFF the first LED 15 once the data storage operation is complete. In this manner, a user may readily identify the current operating state of the storage device 10 by visually interrogating the LEDs of the output unit 14.

The controller may operate the LEDs 15 to 18 of the output unit 14 independently or collectively according to a particular mode of operation for the storage device 10, the progress (or state) of an ongoing data storage operation, receipt of an input command, etc.

For example, the controller may operate the LEDs 15 to 18 in a first pattern when the storage device 10 is communicating (i.e., sending and/or receiving) data with the host following receipt of the input command. The controller may operate the LEDs 15 to 18 in a second pattern while the storage device 10 is performing a background operation. Here, the term "background operation" is used to generally denote one or more operation(s) that may be performed by the storage device 10 itself, without necessarily involving the host. Background operation(s) may include certain internal operations performed in response to software and/or firmware residing in the storage device 10.

One or more data storage operation(s) may be performed once the storage device 10 is connected to the host via the interface 12. Data storage operations may take many different forms, but will typically involve the communication of data from the host (e.g., a server) to the storage device 10, temporary storage of the communicated data in volatile memory space (e.g., the main memory) provided by the storage device 10, and subsequent transfer (or programming) of the temporarily stored data to non-volatile memory space (e.g., the storage) provided by the storage device 10. Here, data may be variously communicated between these system elements.

In the embodiment illustrated in FIGS. 1 and 2, the input unit 13 and output unit 14 are commonly disposed on one side surface of the housing 11 opposite to another side surface including the interface 12. With this configuration a user may activate button on the input unit 13 while visualizing the LEDs of the output unit 14.

Figure 3:
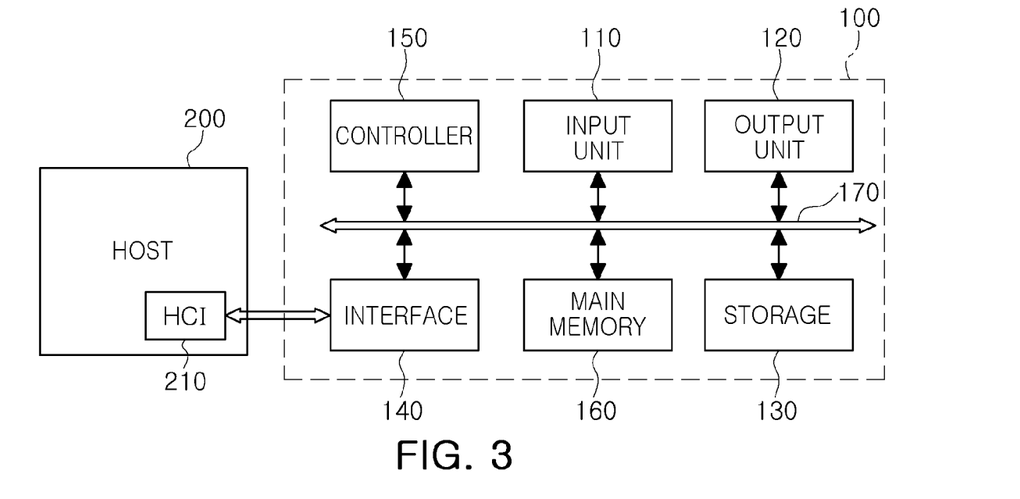
FIG. 3 is a block diagram further illustrating operation of a storage device according to embodiments of the inventive concept.
Figure 4:
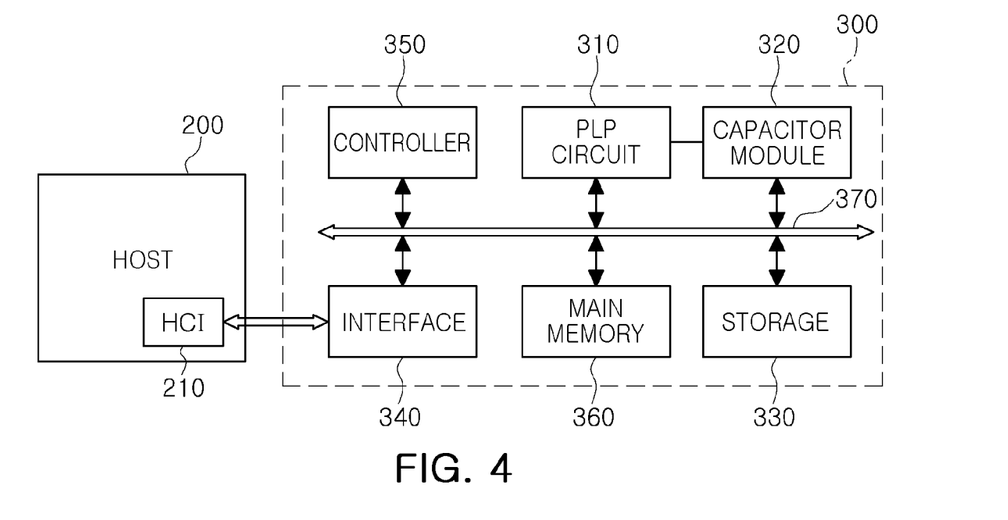
FIG. 4 is a comparative example for the storage device described in relation to FIGS. 1, 2, and 3.

FIGS. 3 and 4 are respective block diagrams further illustrating operation of storage devices 100 and 300 according to embodiments of the inventive concept.

Referring to FIG. 3, the storage device 100 is an external storage device connected to a host 200. The storage device 100 may include an input unit 110, an output unit 120, a storage 130, an interface 140, a controller 150 and a main memory 160, where the input unit 110, output unit 120, storage 130, interface 140, controller 150 and main memory 160 communicate data, address information and/or command(s) via a bus 170.

The interface 140 of the storage device 100 may be connected to a host controller interface (HCI) 210 of the host 200.

In one example, the host 200 is a server that is continuously operate without shutdown or power supply interruption. That is, the host 200 may be connected to continuous backup, or self-power generation equipment in order to preclude unscheduled interruption of operation. In this continuous operating environment for the host 200, the storage device 100 must be routinely connectable and/dis-connectable from the host 200 in a manner that does not interrupt operation of the host 200. However, as the storage device 100 is disconnected from the host 200 it is possible that data temporarily stored in the main memory 160 but not yet transferred (or copied) to the storage 130 may be inadvertently lost.

To avoid this possibility, certain embodiments of the inventive concept allow a user desiring to disconnect the storage device 100 from the host 200 to visually interrogate the status of the storage device 100 before disconnecting it from the host 200. That is, the user may press a button on the input unit 110 and confirm the status or progress of data storage operation(s) being performed by the storage device 100 by visualizing the output unit 120. After confirming that all ongoing data storage operations are, in fact, complete (i.e., all data previously communicated from the host 200 are safely stored in non-volatile memory provided by the storage 130), the user may confidently disconnect the storage device 100 from the host 200.

Referring to FIG. 4, the storage device 300 may include a power loss protection (PLP) circuit 310, a capacitor module 320, a storage 330, an interface 340, a controller 350 and a main memory 360. Respective operation of the storage 330, interface 340, controller 350 and main memory 360 may be similar to those previously described with reference to the storage 130, interface 140, controller 150 and many memory 160 of FIG. 3.

In this regard, the storage device 300 illustrated in FIG. 4 may be understood as a comparative example for consideration with respect to embodiments of the inventive concept. Of particular note, the storage device 300 of FIG. 4 includes the PLP circuit 310 and capacitor module 320, where the PLP circuit 310 may be used to charge capacitor(s) included in the capacitor module 320 while the storage device 300 is electrically connected to the host 200. The capacitor module 320 may include an electrolytic cap capacitor, a tantalum cap capacitor, or the like.

Given this comparative configuration, when the storage device 300 is disconnected from the host 200 during continuous operation of the host 200, the capacitor module 320 charged by the PLP circuit 310 may be used as a power supply for limited operation of the storage device 300. Accordingly, the storage device 300 may operate using the power supplied by the capacitor module 320 for a limited period of time after the storage device 300 is disconnected from the host 200. Accordingly, during this limited period of time, data temporarily stored in data buffer(s) associated with the interface 340 and/or data temporarily stored in main memory 360 may be backed up, thereby avoiding loss of data due to disconnection of the storage device 300 from the host 200.

To connect as many storage devices 300 as possible to a plurality of server modules included in a server such as host 200, it may be important to reduce a size of the storage device 300. However, since the storage device 300 necessarily includes a large-volume capacitor module 320, certain physical size parameters of the storage device 300 become unavoidable. As a result, the number of the storage devices 300 connectable to the host 200 is adversely limited.

In contrast, embodiments of the inventive concept, such as the storage device 100 of FIG. 3, may ensure the completion of data storage operations before disconnection of the storage device 100 from the host 200. In one approach, for example, user activation of a button on the input unit 110 of the storage device 100 may cause certain backup operations to be executed, thereby transferring data stored in volatile memory space (e.g., buffer(s) associated with the interface 140, main memory 160) to non-volatile memory space (e.g., storage 130). After confirming completion of ongoing data storage operation(s) and/or completion of the backup operation(s) by visually interrogating the output unit 120, the user may safely disconnect the storage device 100 from the host 200. Accordingly, the PLP circuit 310 and capacitor module 320 of FIG. 4, which occupy a disproportionate volume of the physical space demanded by the storage device 300, may be completely omitted or drastically to reduce in size in relation to the storage device 100. As a result, a greater number of storage devices 100 may be connected to the host 200 to improve operating performance of the host 200.

Figure 5:
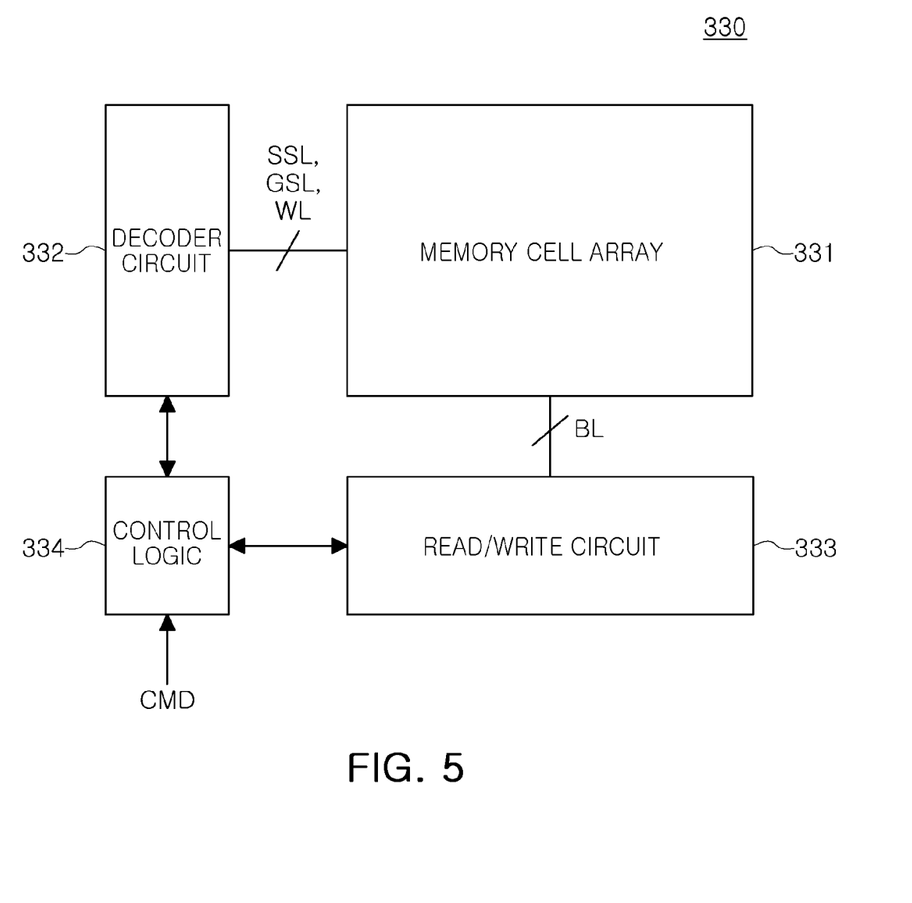
FIG. 5 is a block diagram of the a storage that may be included in a storage device according to an embodiment of the inventive concept.

FIG. 5 is a block diagram of a storage 330 that may be included as the storage 130 in the storage device 100 of FIG. 3 according to an embodiment of the inventive concept.

Referring to FIG. 5, the storage 330 may include a memory cell array 331 and a memory controller, where the memory controller includes a decoder circuit 332, a read/write circuit 333, and control logic 334.

The memory cell array 331 may include a plurality of non-volatile memory cells. In certain embodiments, at least some portion of the memory cells may be arranged and connected in a memory cell string. The memory cell array 331 may include a plurality of memory cell strings, and the plurality of memory cell strings may be divided into a plurality of blocks.

In certain embodiments, the decoder circuit 332 may be connected to memory cells via a word line WL, a string select line SSL, and a ground select line GSL, and the like. The read/write circuit 333 may be connected to the memory cells via a bit-line BL. In example embodiments, the address decoder circuit 332 may select a memory cell to which data is to be written or from which data is to be read, and may receive address information for selecting a memory cell.

The read/write circuit 333 may write data to a memory cell or read data from the memory cell. The read/write circuit 333 includes a plurality of page buffers. Each of the plurality of page buffers may be connected to at least one bit-line BL. Operation of the decoder circuit 332 and the read/write circuit 333 may be controlled by the control logic 334. The control logic 334 may control the decoder circuit 332 and the read/write circuit 333 in response to an externally transmitted command CMD.

AT least some of the memory cells included in the memory cell array 331 are non-volatile memory cells. In the certain embodiments of the inventive concept, when a button included in the input unit 110 of the storage device 100 of FIG. 3 is activated, the controller 150 may cause data variously stored (or buffered) in volatile memory space (e.g., the main memory 160 or buffers associated with the interface 140) to be transferred to the storage 330 in order to prevent of loss of such data as the storage device 100 is disconnected from the continuously operating host 200.

Figure 6:
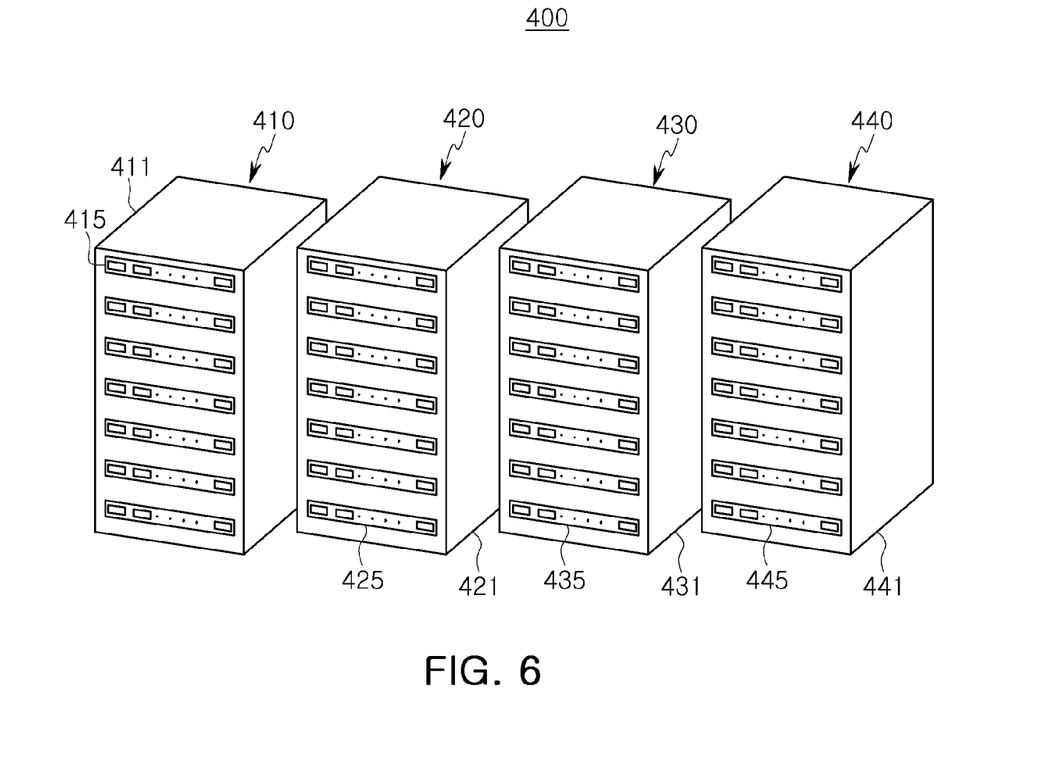
FIG. 6 is a perspective view illustrating a server to which a storage device according to an embodiment of the inventive concept may be connected.

FIG. 6 is a perspective diagram illustrating a server 400 that may include one or more storage device(s) according to embodiments of the inventive concept.

Referring to FIG. 6, the server 400 includes a plurality of unit servers 410, 420, 430 and 440. The unit servers 410 to 440 respectively include base frames 411 to 441 and server modules 415 to 445 mounted in the base frames 411 to 441. As an example, the base frames 411 to 441 may be cabinet-type rack mounts in which the server modules 415 to 445 may be stacked mounted.

The server modules 415 to 445 may be mounted in the base frames 411 to 441 and may have sizes defined according to a predetermined standard. As an example, each of the server modules 415 to 445 may have a height defined in units of 1U having a length of 1.75 inches. At least some of the server modules 415 to 445 may have different heights to each other. An interconnection for supplying power, a network, and the like may be connected to at least one of front and back surfaces of the server modules 415 to 445.

According to various needs, the storage devices may be externally connected to the server modules 415 to 445. The storage device externally connected to the server modules 441 to 445 may be an SSD device and may exchange data with the server modules 441 to 445 through a predetermined interface. An interface of the storage device may be disposed on a surface, having a minor axis of the storage device, to connect a great number of storage devices to the server modules 441 to 445.

A size of the storage device needs to be reduced to connect as many storage devices to the server modules 441 to 445 as possible. In order to prevent data loss which may occur when the storage device is disconnected from the server modules 441 to 445 while the server 400 continuously operates, a capacitor module may be included in the storage device to supply power for a predetermined time after the storage device is disconnected from the server modules 441 to 445. However, as has been described above, since the capacitor module includes elements having a relatively large size, it may be difficult to reduce a size of the storage device.

In certain embodiments of the inventive concept, to address the above issue, a capacitor module need not be included in the storage device. Instead, the storage device may be provided with an input unit having a button, and an output unit having LED(s) that provide a visual status indication with to ongoing data storage operations and/or backup operations, so that the storage device may be safely disconnected from the server 400 even during continuous operation of the server 400. Since the input unit and the output unit may be implemented with relatively smaller size than the capacitor module and a PLP circuit, the overall size of the storage device may be reduced.

Figure 7:
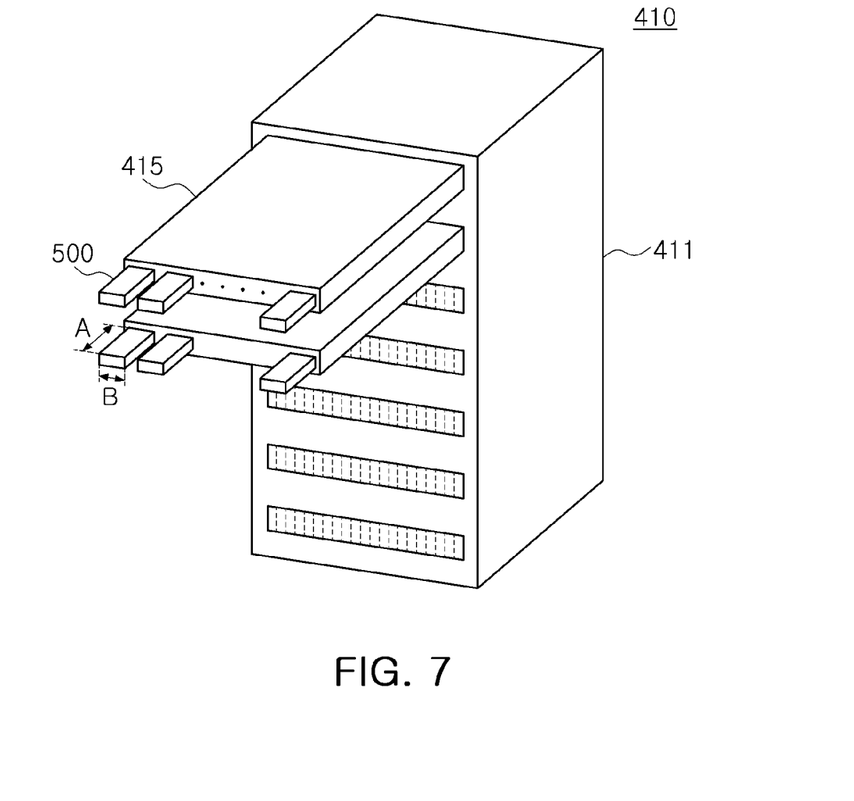
FIGS. 7 and 8 are respective views further illustrating possible connection between a server and storage device(s) according to an embodiment of the inventive concept.
Figure 8:
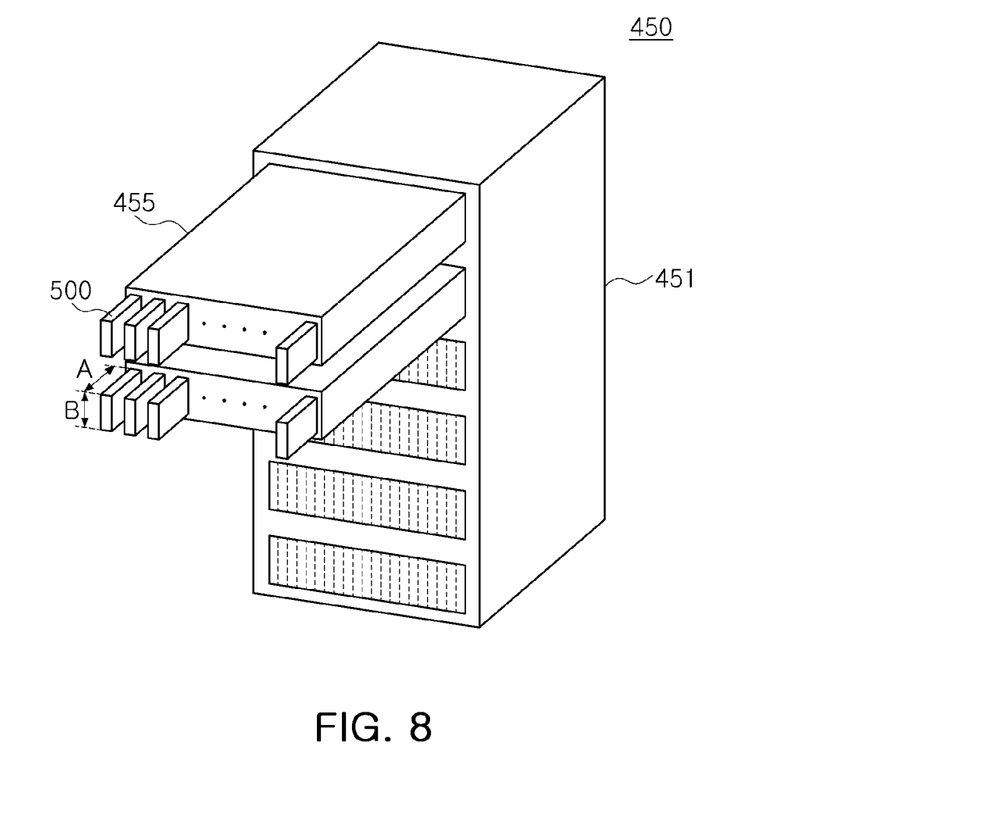

FIGS. 7 and 8 respectively illustrate connection structures between a server and a storage device according to embodiments of the inventive concept.

In the embodiment illustrated in FIGS. 6 and 7, the unit server 410 may include a plurality of server modules 415 mounted on the base frame 411. A height of each of the server modules 415 may be 1U. An interface may be provided on a surface having a minor axis B of a storage device 500, rather than a major axis A, to connect as many storage devices 500 as possible to each of the server modules 415.

Referring to FIG. 8, a unit server 450 includes a base frame 451 and server modules 455. A height of each of the server modules 455 may be 2U or more. Unlike the embodiment illustrated in FIG. 7, in the embodiment illustrated in FIG. 8, a storage device 500 may be connected to the unit server 450 in an upright manner. Similarly to the embodiment illustrated in FIG. 7, in the embodiment illustrated in FIG. 8, an interface of each of the storage devices 500 may be disposed on a surface having a minor axis B rather than a major axis A.

Figure 9:
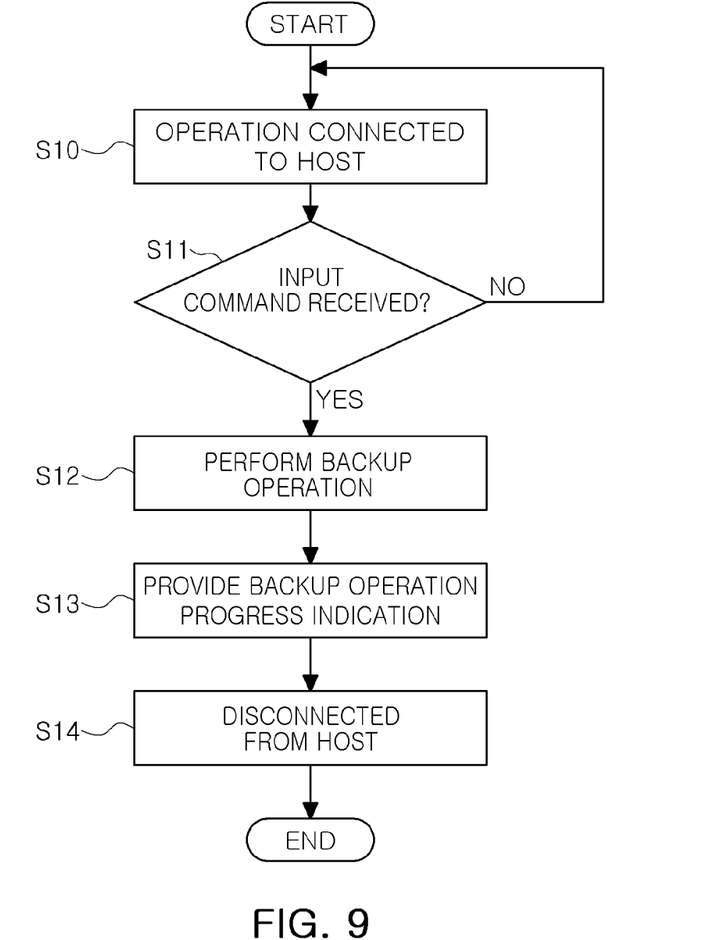
FIGS. 9 and 10 are respective flowcharts further illustrating operation of a storage device according to an embodiment of the inventive concept.
Figure 10:
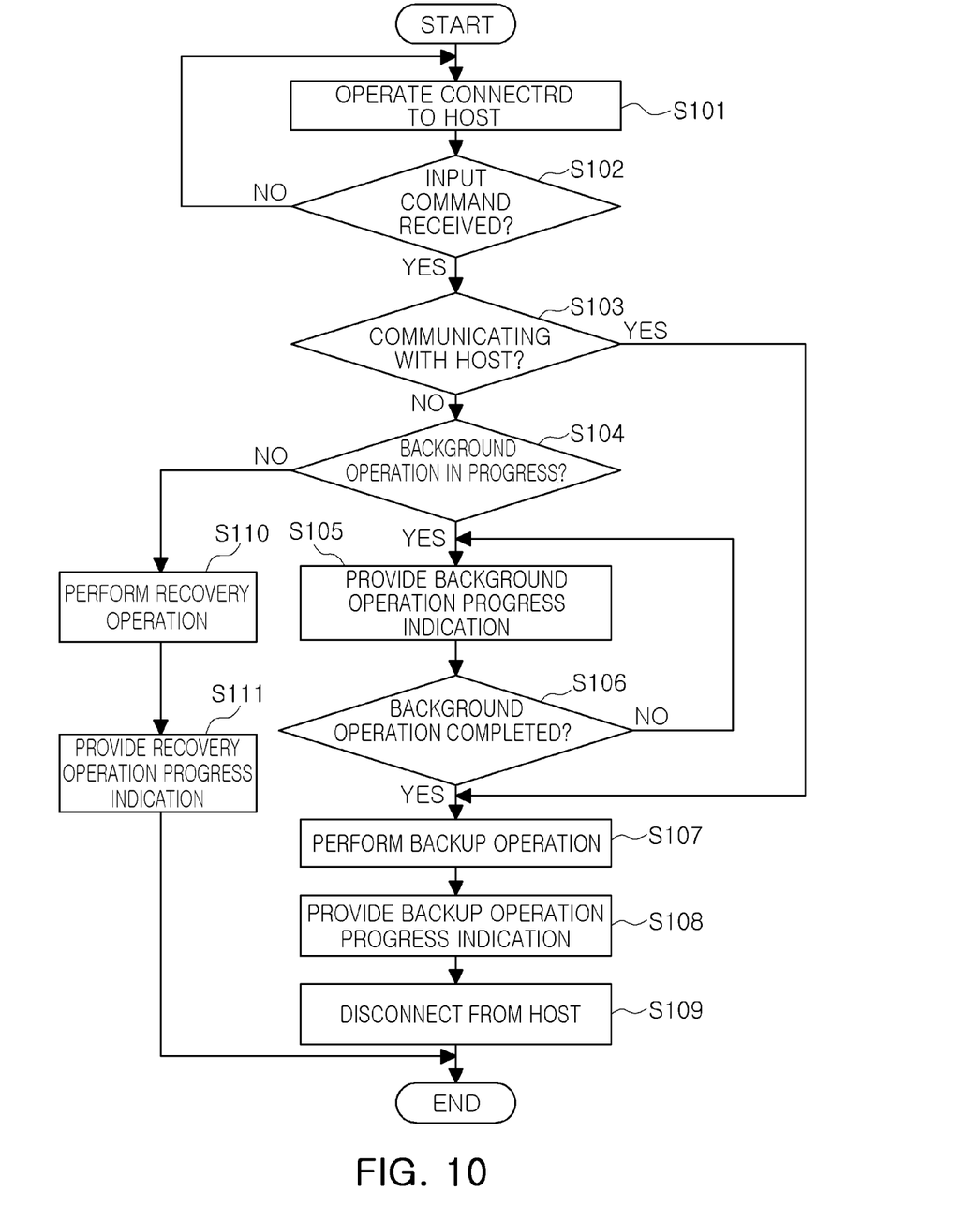

FIGS. 9 and 10 are respective flowcharts illustrating operation of a storage device according to embodiments of the inventive concept.

Referring to FIGS. 1, 2, 3 and 9, a method of operating a storage device—like the exemplary storage devices 10 and 100 previously described in the foregoing embodiments—assumes that the storage device 100 is initially connected to the host 200 (e.g., a server) (S10). It is further assumed, consistent with the foregoing embodiments, that the host 200 is continuously operated without unscheduled power interruptions. Here, the mechanical/electrical connection between the storage device 100 and the host 200 may be made through, or by means of, the interface 140. In certain embodiments of the inventive concept, the interface 140 of the storage device 100 may be disposed on a housing side surface extending along a minor axis of the storage device 100, such that the host 200 may efficiently connect as many storage devices 100 as possible.

With the storage device normally operating in connection with the host 200 via the interface 140, the controller 150 of the storage device 100 may determine (or detect) when an input command is received (S11). Here, the term "input command" may be any recognizable control signal (electrical, optical or mechanical) generated by the storage unit 100 in response to an input received through the input unit 110. For example, one type of input command may be an electrical signal generated in response to a user pressing a button associated with the input unit 110. As previously noted, one or more buttons may be conveniently provided in relation to the input unit 110 on a user-accessible, housing side surface of the storage device 100. So long as an input command is not received (S11=NO), the storage device 100 may continuously operate and communicate data with the host 200.

However, when the input command is received (S11=YES), the controller 150 may cause the storage device 100 to perform (or execute) a backup operation (S12). During the execution of the backup operation—until such time as all data has been safely stored in non-volatile memory space of the storage device 100—the output unit 120 may provide a backup operation progress indication (S13). Following completion of the back-up operation, the storage device 100 may be disconnected from the host 200 without risk of data loss (S14).

In the foregoing method, the backup operation may be variously constituted according to the design and operational requirements of the host device 200 and storage device 100. For example, the backup operation may include at least (1) the transfer (e.g., copying) of data stored in buffers associated with the interface 140 to non-volatile memory space provided by the storage 130, and (2) the transfer of data temporarily stored in the main memory 160 to non-volatile memory space provide by the storage 130. In this context, the term "non-volatile memory space" denotes the provision and use of one or more types of data storage media capable of storing data in a non-volatile manner (i.e., data storage media capable of retaining stored data in the absence of applied power) (e.g., NAND flash memory). In contrast, the term "volatile memory space" denotes the provision and use of one or more types of data storage media incapable of reliably storing data in a non-volatile manner (e.g., DRAM, SRAM, etc.).

As previously noted, the output unit of the storage unit 120 may be used to continuously provide operating information regarding the status of the storage unit 100. Such operating information may take many different forms, but may include certain indications visually recognizable by a user (e.g., LED states). At a minimum during execution of the backup operation (S12), the controller 150 may output a backup operation progress indication using the output unit 120. For example, the controller 150 may cause the output unit 120 to display a second LED activation pattern (e.g., flashing LED(s)) indicating the ongoing execution of the backup operation. In contrast, during normal connection and operation of the storage device 100 with the host 200 (i.e., during execution of "normal" data communication operations between the storage device 100 and the host 200, as opposed to special execution of a backup operation, a background operation and/or a recovery operation), the controller 150 may cause the output unit 120 to display a first LED activation pattern indicating normal operation.

Those skilled in the art will recognize that a great variety of "indications" may be used by the output unit 120 to effectively inform a user regarding the operational state of the storage device 100 and/or the host 200. One or more LEDs may be used to provide a visual indication. In this regard, the LEDs may be multi-colored and/or variously arranged. Alternately or additionally, audio or tactile features may be used by the output unit 120 to further inform a user regarding the operational state of the storage device 100 and/or the host 200.

Regardless of the particular nature of the indication(s) provided by the output unit 120, a user may confidently disconnect the storage device 100 from the host 200 without fear of losing data by appropriately interrogating the indication(s). So, in certain embodiments of the inventive concept, a user may visually interrogate the displayed pattern(s) of one or more LED(s) provided by the output unit 120 in order to ascertain the state, execution progress, and/or completion status of a backup operation.

Referring to FIGS. 1, 2, 3 and 10, another method of operating the storage device 100 according to embodiments of the inventive concept again assumes that the storage device 100 is appropriately connected to a continuously operating host 200 (S101). Here again, the controller 150 determines when an input command is received (S102). Upon determining that an input command has been received (S102=YES), the controller 150 further determines whether the storage device 100 is currently communicating with the host 200 (S103) (i.e., whether the storage device 100 is communicating data with the host 200). This further determination may be made, for example, by having the controller 150 interrogate the status of the interface 140 (e.g., examine a registry value designated to indicate the state of the interface 140). In certain embodiments of the inventive concept, the interface 140 may be a Peripheral Component Interconnect Express (PCI Express) interface, and accordingly, the controller 150 may determine whether data communication between the host 200 and the storage device 100 in ongoing based on the state of a PCI reset field (PERST) value among a set of conventionally understood registry values. Alternately, the interface 140 may be a Serial Advanced Technology Attachment (SATA) interface, and accordingly, the controller 150 may determine whether data communication between the host 200 and the storage device 100 is ongoing based on a power disable (PWRDIS) value.

When it is determined that the host 200 and storage device 100 are communicating (S103=YES), the controller 150 may cause the storage device 100 to perform (or execute) the backup operation (S107). As before, the backup operation may be used to transfer data stored in volatile memory space of the storage device to non-volatile memory space, such as that provided by the storage 130. During execution of the backup operation, the output unit 120 of the storage device 100 may be used to provide a backup operation progress indication (S108), like those described above or similar. Once the backup operation is completed and the output unit 120 correspondingly indicates same, the storage device 100 may be safely disconnected from the host 200 (S109).

However, if the controller determines that the host 200 and storage device 100 are not currently communicating (S103=NO), the controller 150 may further determine whether a background operation is currently being performed (S104) (i.e., whether a background operation is in progress). As will be appreciated by those skilled in the art, a variety of background operation(s) may be routinely executed during normal connection and operation of the storage device 100 with the host 200. For example, certain background operation(s) may be executed by firmware during idle periods in the communication of data between the storage device 100 and host 200.

Upon determining that the background operation is in progress (S104=YES), the controller 150 may provide a background operation progress indication (S105). The background operation progress indication may be different from, or the same as the backup operation progress indication. In this regard, the controller 150 may monitor the execution of the background operation until it is completed while continuously providing the background operation progress indication (S106). Once the background operation is completed (S106=YES), the controller 150 may cause the storage device 100 to execute the backup operation (S107).

However, when the controller 150 determines that a background operation is not in progress (S104=NO) after previously determining that the storage device 100 is not currently communicating with the host 200 (S103=NO), then the controller 150 may cause the storage device 100 to execute a recovery operation associated with one or more abnormal operating states (S110). During execution of the recovery operation the controller 150 may provide a recovery operation progress indication (S111) using the output unit 120. For example, the controller 150 may store debugging information in storage 130 or elsewhere in the form of a log file or the like while the recovery operation is executed, and may reboot the storage device 100 after the recovery operation is completed.

In the foregoing example the backup operation progress indication, the background operation progress indication, and the recovery operation progress indication may be different, or the same, LED patterns generated by operation of the output unit 120.

FIGS. 11A, 11B, 12A and 12B are respective diagrams further illustrating methods of operation for storage device according to embodiments of the inventive concept.

Figure 11A:
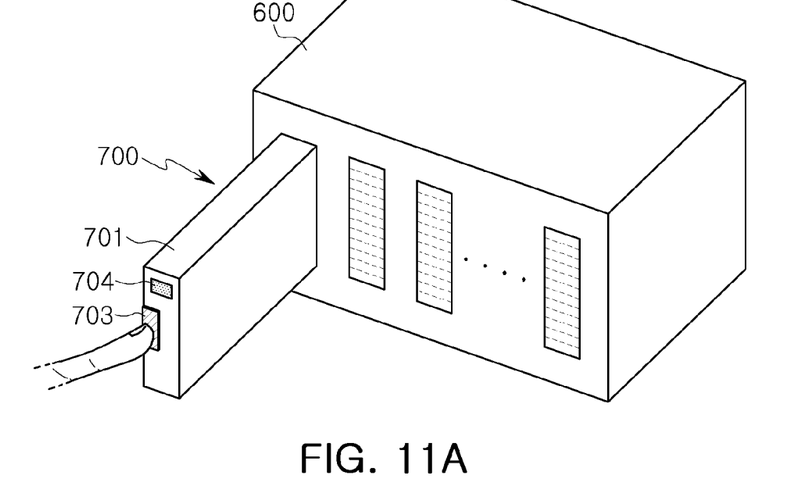
FIGS. 11A, 11B, 12A and 12B are respective views illustrating possible connection of a storage device according to an embodiment of the inventive concept.

Referring to FIG. 11A, a user may press a button 703 associated with a storage device 700 is connected to a host server module 600. The storage device 700 may include the button 703 as well as an LED 704 mounted on a forward-facing (i.e., forward facing towards the user) side surface of housing 701 of the storage device 700. Here, the user activation of the button 703 is interrupted as an input command by a controller of the storage device 700 to begin execution of a backup operation.

In this regard, the normal connection and operation of the storage device 700 may be indicated by constant illumination of the LED 704 (i.e., a first storage device operating state indication), while the execution of the backup operation of the storage device 700 (i.e., a second storage device operating indication, or the backup operation progress indication) may be indicated—following the user activation of the button 703—by blinking or flickering illumination of the LED 704. Once the backup operation is completed, the controller return the LED 704 to the first storage device operating state indication or change the LED 704 output to a third storage device operating state indication (e.g., non-illumination).

However, completion of the backup operation is indicated by the storage device 700, a user may confidently disconnect the storage device 700 from the host module 600 without fear of losing data by simply interrogating (i.e., looking at) the illumination state of the LED 704. See, for example, FIG. 11B.

Figure 11B:
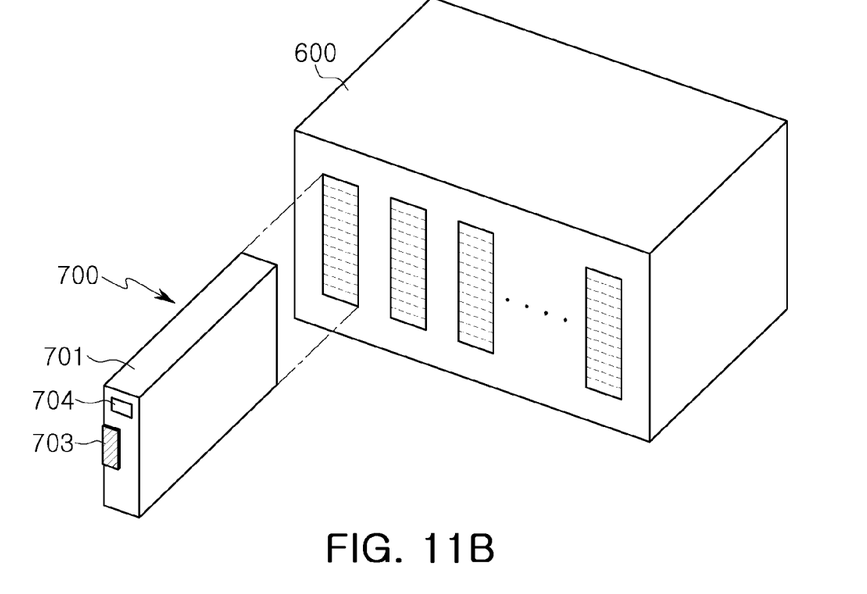

In this manner, possible data loss due to an uncontrolled or ambiguous state disconnection of the storage device 700 from the server module 600 may be avoided without the requirement of complicated and expensive power-off protection functions, such as those associated with a capacitor module. This approach may also enable a reduction in the physical size of the storage device 700.

Figure 12A:
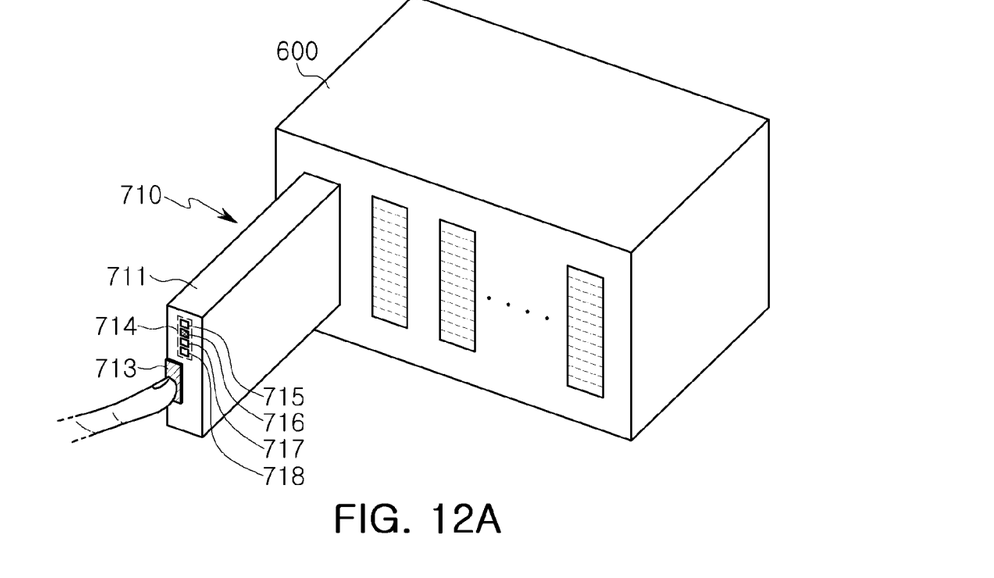
Figure 12B:
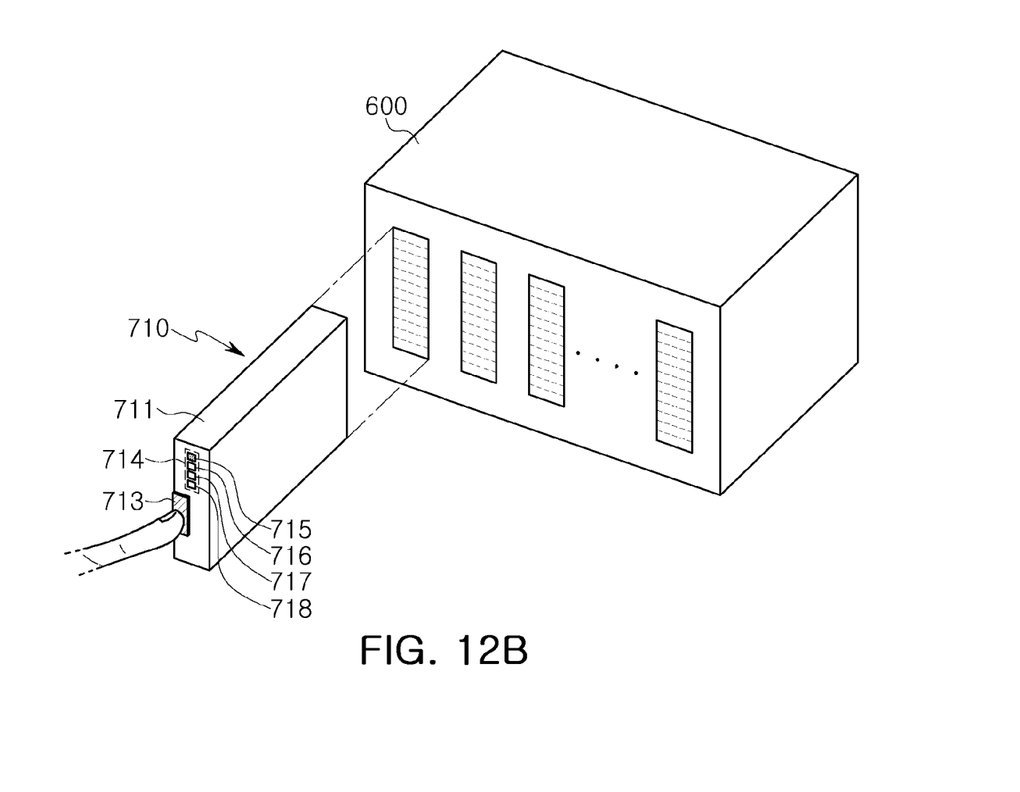

Referring now to FIGS. 12A and 12B, an alternate operating approach for a storage device 710, similar in many respects to the storage device 700 of FIGS. 11A and 11B, is presented.

Here, the single LED 704 of FIGS. 11A and 11B is replaced by a plurality of LEDs 714, including discrete LEDs 715, 716, 717 and 718. Thus, when a user activates the button 713 disposed on a forward-facing surface of housing 711 of the storage device 710, the plurality of LEDs 714 may be variously illuminated to generate different patterns indicating: (e.g.,) a first storage device operating state indication associated with normal connection and operation of the storage device 710; a second storage device operating indication, or the backup operation progress indication, associated with ongoing execution of the backup operation by the storage device 710; and a third storage device operating state indication associated with completion of the backup operation.

With reference to the method described in relation to FIG. 10, the single LED 704 of FIGS. 11A and 11B or the plurality of LEDs 714 of FIGS. 12A and 12B may also be used to provide other storage device operating state indications, such as those associated with ongoing execution of a background operation, completion of the background operation, ongoing execution of a recovery operation, and/or completion of the recovery operation. Various LED indications may be transient in nature or steady-state indications. Colored LEDs may be used to good advantage to emphasize various storage device operating states.

As may be understood from the foregoing example embodiments, different operations may be executed by a storage device connected to a continuously operating host. One or more of these operations may be initiated by a user pressing a button. For example, the storage device may cause execution of a backup operation when the button is pressed once, and cause execution of a recovery operation when the button is pressed twice or held down for long duration. Alternatively, the storage device may include a plurality of buttons, and one or more input command(s) may be generated in response to different operations of the plurality of buttons.

As may be further understood from the foregoing example embodiments, a storage device connected to a server may include an input unit having a button and an output unit having an LED. When an input command is generated by pressing the button, the storage device may execute a backup operation to store data, being pressed, in a nonvolatile memory and may output a state of progress of the backup operation using the LED. By pressing the button and confirming a state of progress of the back operation through the LED, a user may safely disconnect the storage device from the server after the backup operation is completed.

While example embodiments have been shown and described above, it will be apparent to those skilled in the art that modifications and variations could be made without departing from the scope of the present inventive concept as defined by the appended claims.

What is claimed is:

1. A method of operating a storage device configured for connection with a host, the method comprising:
   receiving data from the host and temporarily storing the data in a main memory;
   receiving a user input through an input unit;
   in response to determining the user input is received and the storage device is communicating with the host, executing a backup operation in which the data temporarily stored in the main memory is transferred to a non-volatile memory;
   in response to determining the user input is received, the storage device is not communicating with the host and the storage device is executing a background operation, completing the background operation before executing the backup operation;
   in response to determining the user input is received and the storage device is neither communicating with the host nor executing a background operation, executing a recovery operation of recovering from an abnormal state; and
   providing a storage device operating state indication to a user through an output unit during execution of each of the backup operation, the background operation, and the recovery operation.

2. The method of claim 1, wherein the storage device comprises an interface providing a mechanical/electrical connection between the storage device and the host.

3. The method of claim 2, wherein:
   the output unit and the input unit are disposed on a forward-facing side surface of the storage device, and
   the interface is disposed on a rearward-facing side surface of the storage device opposing the forward-facing side surface.

4. The method of claim 2, wherein the interface is a Peripheral Component Interconnect Express (PCI Express) interface or a Serial Advanced Technology Attachment (SATA) interface.

5. The method of claim 2, further comprising transferring data from a buffer associated with the interface to the non-volatile memory during the backup operation.

6. The method of claim 1, wherein the input unit comprises at least one button.

7. The method of claim 1, wherein:
   the output unit comprises at least one light emitting diode (LED), and
   the providing of the storage device operating state indication to the user through an output unit during execution of the backup operation comprises providing an illumination pattern for the at least one LED corresponding to the execution of the backup operation.

8. The method of claim 7, wherein the at least one LED includes a plurality of LEDs and at least two LEDs among the plurality of LEDs have different colors.

9. A method of operating a storage device configured for connection to a continuously operating host, the method comprising:
   determining whether an input command is received through an input unit when the storage device is connected to the host and executing a normal operation that communicates data from the host and temporarily stores the data in a main memory of the storage device;
   in response to determining the input command is received when the storage device is executing the normal operation, executing a backup operation in which the data temporarily stored in the main memory of the storage device is transferred to a non-volatile memory;

in response to determining the input command is received, the storage device is not executing the normal operation and the storage device is executing a background operation, completing the background operation before executing the backup operation;

in response to determining the input command is received and the storage device is neither executing the normal operation nor executing a background operation, executing a recovery operation of recovering from an abnormal state;

during a least a portion of the execution of the backup operation, providing a backup operation progress indication through an output unit; and providing a background operation indication through the output unit during the execution of the background operation and providing a recovery operation indication through the output unit during the execution of the recovery operation.

10. The method of claim 9, further comprising disconnecting the storage device from the host in response to the backup operation progress indication.

11. The method of claim 10, wherein:
the storage device comprises an interface providing a mechanical/electrical connection between the storage device and the host,
the output unit and the input unit are disposed on a forward-facing side surface of the storage device, and
the interface is disposed on a rearward-facing side surface of the storage device opposing the forward-facing side surface.

12. The method of claim 11, further comprising transferring data from a buffer associated with the interface to the non-volatile memory during the backup operation.

13. The method of claim 9, wherein the output unit comprises at least one light emitting diode (LED) and the providing of the backup operation progress indication comprises providing an illumination pattern for the at least one LED corresponding to the execution of the backup operation.

14. The method of claim 13, wherein the at least one LED includes a plurality of LEDs and at least two LEDs among the plurality of LEDs have different colors.

15. A method of operating a storage device configured for connection to a continuously operating host, the method comprising:
determining whether an input command is received through an input unit when the storage device is connected to the host and executing a normal operation that communicates data from the host and temporarily stores the data in a main memory of the storage device;
upon determining that the input command is received, further determining whether the storage device is communicating with the host;
if the storage device is communicating with the host, executing a backup operation while providing a backup operation progress indication through an output unit, else if the storage device is not communicating with the host, determining whether a background operation is being executed; and
if the background operation is being executed, completing execution of the background operation while providing a background operation progress indication through the output unit, else if the background operation is not being executed, executing a recovery operation while providing a recovery operation progress indication through the output unit.

16. The method of claim 15, wherein:
the storage device comprises an interface providing a mechanical/electrical connection between the storage device and the host,
the output unit and the input unit are disposed on a forward-facing side surface of the storage device, and
the interface is disposed on a rearward-facing side surface of the storage device opposing the forward-facing side surface.

17. The method of claim 16, further comprising:
transferring data temporarily stored in the main memory to a non-volatile memory, and
transferring data from a buffer associated with the interface to the non-volatile memory during the backup operation.

18. The method of claim 16, wherein the output unit comprises at least one light emitting diode (LED) and the providing of the backup operation progress indication comprises providing a first illumination pattern for the at least one LED corresponding to the execution of the backup operation.

19. The method of claim 18, wherein the providing of the background operation progress indication comprises a second illumination pattern for the at least one LED different from the first illumination pattern.

20. The method of claim 19, wherein the providing of the recovery operation progress indication comprises a third illumination pattern for the at least one LED different from the first illumination pattern and the second illumination pattern.

* * * * *